United States Patent
Smith et al.

(10) Patent No.: US 10,609,920 B2
(45) Date of Patent: Apr. 7, 2020

(54) SYSTEM AND METHOD FOR OPERATING ANIMAL DECOYS TO SIMULATE THE MOVEMENT OF ANIMALS

(71) Applicants: Shannon Smith, Tyler, TX (US); Allen Gardner, Tyler, TX (US); Jason Gregory, Tyler, TX (US)

(72) Inventors: Shannon Smith, Tyler, TX (US); Allen Gardner, Tyler, TX (US); Jason Gregory, Tyler, TX (US)

(*) Notice: Subject to any disclaimer, the term of this patent is extended or adjusted under 35 U.S.C. 154(b) by 265 days.

(21) Appl. No.: 15/417,481

(22) Filed: Jan. 27, 2017

(65) Prior Publication Data

US 2017/0295775 A1    Oct. 19, 2017

(51) Int. Cl.
*A01M 31/06* (2006.01)
*B65H 75/44* (2006.01)
*A01K 91/06* (2006.01)

(52) U.S. Cl.
CPC .......... *A01M 31/06* (2013.01); *A01K 91/065* (2013.01); *B65H 75/4471* (2013.01); *B65H 75/4486* (2013.01); *B65H 2701/35* (2013.01)

(58) Field of Classification Search
CPC .............................. A01M 31/06; A01K 91/065
USPC .......... 43/2, 3, 19.2; 446/153, 154, 156, 160
See application file for complete search history.

(56) References Cited

U.S. PATENT DOCUMENTS

| | | | | |
|---|---|---|---|---|
| 740,293 | A | * | 9/1903 | Loeble .................. A01M 31/06 43/3 |
| 1,597,703 | A | * | 8/1926 | Young .................. A01K 91/065 43/26.2 |
| 1,850,296 | A | * | 3/1932 | Vermeulen ........... A01K 91/065 43/15 |
| 2,028,849 | A | * | 1/1936 | Shay ..................... A01M 31/06 43/3 |
| 2,129,781 | A | * | 9/1938 | Park ...................... A01M 31/06 43/3 |

(Continued)

FOREIGN PATENT DOCUMENTS

| | | | | |
|---|---|---|---|---|
| CA | 2851882 | A1 | * 11/2014 | ............ A01M 31/06 |
| FR | 2671691 | A1 | * 7/1992 | ............ A01M 31/06 |

(Continued)

*Primary Examiner* — Darren W Ark

(57) ABSTRACT

The present invention relates to decoys for simulating the movement of animals on land, air, or water. The invention includes a small, enclosed, and portable unit containing a motor, a rechargeable power supply, a timing control mechanism, and a spool attached to a line. The line extends from the unit and attaches to one or more animal decoys and, at the end, to an anchoring mechanism (e.g., an anchor placed in the water or a tether attached to a tree or other stationary support). The anchoring mechanism preferably is attached to the line via a bungee cord or other flexible connection that exhibits elasticity. The preferred embodiment of the invention includes four main parts: (1) a string portion, which extends from an anchor system to a mechanical unit; (2) one or more animal decoys attached to the string portion; (3) an anchor assembly attached to one end of the string assembly for creating tension in the string assembly and securing its position; and (4) a mechanical unit containing a low-power, motorized spool assembly, a rechargeable power supply, a spool, and a timing mechanism for repeatedly winding and releasing the string portion.

1 Claim, 4 Drawing Sheets

(56) References Cited

U.S. PATENT DOCUMENTS

| | | | | |
|---|---|---|---|---|
| 2,252,795 A * | 8/1941 | Weems | A01M 31/06 | 43/3 |
| 2,457,295 A * | 12/1948 | Woodhead | A01M 31/06 | 43/3 |
| 2,483,537 A * | 10/1949 | Girard | A01K 87/04 | 43/19.2 |
| 2,643,478 A * | 6/1953 | Paulsen | A01K 91/065 | 43/19.2 |
| 2,665,591 A * | 1/1954 | Casselman | A01K 91/065 | 43/26.1 |
| 2,691,233 A * | 10/1954 | Richardson | A01M 31/06 | 43/3 |
| 2,707,843 A * | 5/1955 | Howe | A01K 91/065 | 43/26.1 |
| 2,747,814 A * | 5/1956 | Taylor | A01M 31/06 | 242/379.2 |
| 2,793,456 A | 5/1957 | Argo | | |
| 2,849,823 A * | 9/1958 | Miller | A01M 31/06 | 43/3 |
| 2,860,842 A * | 11/1958 | Ryan | A01M 31/06 | 242/375.3 |
| 2,861,378 A * | 11/1958 | Bell | A01K 97/125 | 43/19.2 |
| 2,917,857 A * | 12/1959 | Muszynski | A01M 31/06 | 43/3 |
| 3,016,647 A * | 1/1962 | Peterson | A01M 31/06 | 43/3 |
| 3,382,609 A | 5/1968 | Neanhouse | | |
| 3,466,784 A * | 9/1969 | Bonner | A01K 91/065 | 43/19.2 |
| 3,550,302 A * | 12/1970 | Creviston | A01K 91/065 | 248/158 |
| 3,645,030 A * | 2/1972 | Milburn, Jr. | A01K 91/065 | 43/26.1 |
| 3,675,870 A * | 7/1972 | Ride | A01K 89/017 | 242/250 |
| 3,787,678 A * | 1/1974 | Rainer | F21L 4/085 | 362/183 |
| 3,927,485 A * | 12/1975 | Thorsnes, Jr. | A01M 31/06 | 43/3 |
| 4,056,890 A * | 11/1977 | Dembski | A01M 31/06 | 43/3 |
| 4,141,167 A * | 2/1979 | Muehl | A01M 31/06 | 43/2 |
| 4,322,908 A * | 4/1982 | McCrory | A01M 31/06 | 43/3 |
| 4,509,287 A * | 4/1985 | Hood | A01K 91/08 | 43/19.2 |
| 4,535,560 A * | 8/1985 | O'Neil | A01M 31/06 | 43/3 |
| 4,599,819 A * | 7/1986 | Voges, Jr. | A01M 31/06 | 43/2 |
| 4,602,451 A * | 7/1986 | Perez | A01K 91/065 | 43/26.1 |
| 4,798,021 A * | 1/1989 | Miklos | A01K 91/08 | 43/19.2 |
| 4,903,428 A * | 2/1990 | Sluiter | A01K 91/065 | 43/26.1 |
| 4,910,905 A * | 3/1990 | Girdley | A01M 31/06 | 43/3 |
| 5,036,616 A * | 8/1991 | Wilsey | A01K 91/065 | 43/19.2 |
| 5,111,609 A * | 5/1992 | Flo | A01K 91/065 | 43/26.1 |
| 5,320,572 A | 6/1994 | Chen | | |
| 5,595,013 A * | 1/1997 | Dubriske | A01K 91/065 | 43/19.2 |
| 5,974,720 A * | 11/1999 | Bowling | A01M 31/06 | 43/2 |
| 6,079,140 A * | 6/2000 | Brock, IV | A01M 31/06 | 43/3 |
| 6,138,396 A * | 10/2000 | Capps | A01M 31/06 | 43/3 |
| 6,311,425 B1 * | 11/2001 | Capps | A01M 31/06 | 43/3 |
| 6,357,159 B1 * | 3/2002 | Bowling | A01M 31/06 | 43/2 |
| 6,374,529 B1 * | 4/2002 | Petroski | A01M 31/06 | 43/3 |
| 6,412,210 B1 * | 7/2002 | Horrell | A01M 31/06 | 43/3 |
| 6,430,863 B1 * | 8/2002 | Krag | A01M 31/06 | 43/3 |
| 6,487,811 B2 * | 12/2002 | Barrett | A01M 31/06 | 43/3 |
| 6,574,902 B1 | 6/2003 | Conger | | |
| 6,665,975 B2 * | 12/2003 | Porter | A01M 31/06 | 43/3 |
| 6,684,819 B1 | 2/2004 | Locke | | |
| 6,782,653 B1 * | 8/2004 | Thomas | A01M 31/06 | 43/2 |
| 6,834,458 B1 * | 12/2004 | Hand, III | A01M 31/06 | 43/2 |
| 6,845,586 B1 * | 1/2005 | Brock, IV | A01M 31/06 | 43/2 |
| 6,957,509 B2 * | 10/2005 | Wright | A01M 31/06 | 43/2 |
| 7,322,144 B2 * | 1/2008 | Brewer | A01M 31/06 | 43/3 |
| 7,562,487 B2 * | 7/2009 | Barr | A01M 31/06 | 43/2 |
| 7,814,857 B2 * | 10/2010 | Hally | A01M 29/16 | 116/22 A |
| 7,963,064 B2 * | 6/2011 | Smith | A01M 31/06 | 43/2 |
| 7,975,422 B2 * | 7/2011 | Elliott | A01M 31/06 | 43/3 |
| 8,188,691 B1 * | 5/2012 | Twohig | A01M 31/06 | 318/139 |
| 8,479,436 B2 | 7/2013 | Elliott et al. | | |
| 8,484,883 B2 | 7/2013 | Rogers | | |
| 8,925,240 B2 | 1/2015 | Beal | | |
| 8,950,103 B2 * | 2/2015 | Bullerdick | A01M 31/06 | 43/2 |
| 9,192,156 B2 * | 11/2015 | McHugh | A01M 31/06 | |
| 9,366,381 B1 * | 6/2016 | Hardebeck | A01M 31/00 | |
| 9,629,356 B1 * | 4/2017 | Frierson, II | A01M 31/06 | |
| 9,668,469 B2 * | 6/2017 | Leventini | A01M 31/06 | |
| 10,010,069 B2 * | 7/2018 | Denson | A01M 31/06 | |
| 10,420,336 B2 * | 9/2019 | Lynn | A01M 31/06 | |
| 2003/0041500 A1 * | 3/2003 | Thomas | A01M 31/06 | 43/2 |
| 2008/0028664 A1 * | 2/2008 | Anthony | A01M 31/06 | 43/3 |
| 2008/0155879 A1 * | 7/2008 | Whipple | A01M 31/06 | 43/3 |
| 2013/0185986 A1 * | 7/2013 | Stiffler | A01M 31/06 | 43/3 |
| 2014/0033596 A1 * | 2/2014 | Schukow | A01M 29/06 | 43/2 |
| 2014/0215894 A1 * | 8/2014 | Mika | A01K 91/065 | 43/43.1 |
| 2014/0338250 A1 * | 11/2014 | Leventini | A01M 31/06 | 43/3 |
| 2016/0100569 A1 * | 4/2016 | Hudson | A01M 31/06 | 43/3 |
| 2019/0008141 A1 * | 1/2019 | Lynn | A01M 31/06 | |

FOREIGN PATENT DOCUMENTS

| | | | | |
|---|---|---|---|---|
| FR | 2873265 A1 * | 1/2006 | | A01M 31/06 |
| FR | 3062283 A1 * | 8/2018 | | A01M 31/06 |
| GB | 2216382 A * | 10/1989 | | A01M 31/06 |
| GB | 2441103 A * | 2/2008 | | A01M 31/06 |
| GB | 2548586 A * | 9/2017 | | A01K 91/06 |
| JP | 04020227 A * | 1/1992 | | |

(56) References Cited

FOREIGN PATENT DOCUMENTS

| WO | WO-9310660 A1 | * | 6/1993 | ............ | A01K 85/00 |
| WO | WO-03086068 A1 | * | 10/2003 | ............ | A01K 91/02 |
| WO | WO-2017074516 A1 | * | 5/2017 | ............ | A01M 31/00 |

* cited by examiner

SYSTEM AND METHOD FOR OPERATING ANIMAL DECOYS TO SIMULATE THE MOVEMENT OF ANIMALS

This application claims priority to U.S. Provisional Application No. 62/324,410, filed on Apr. 19, 2016. The disclosure of the above-cited application is incorporated by reference in its entirety.

FIELD OF THE INVENTION

The present invention relates generally to an apparatus for moving animal decoys to simulate the movement of animals in the water, on land, or in the air.

BACKGROUND OF THE INVENTION

Animal decoys are known in the art as tools for use in hunting, photography, animal watching, target practice, and other outdoor sports and activities. Decoys are generally intended to attract animals to the location of the decoys. Accordingly, decoys are often designed to look like the animals they are intended to represent. Often, decoys are manipulated in some way to simulate movement of the animal, as well. For example, there exist in the art manual jerk strings for use with duck decoys. These jerk strings include an anchor or other weight attached to a flexible cord like a bungee cord. One or more buoyant duck decoys are attached to the cord and placed in the water. At the other end, a hunter repeatedly pulls a string 18-24 inches and releases it, thus stretching and releasing the cord. This repeated movement causes the duck decoys to move back and forth on the water as though the ducks are swimming. A primary problem with such an apparatus is that the constant and repetitive movement of the cord may cause the hunter's hand to get tired. Another problem is that the movement is typically started when animals are known to be close by, such that when an animal is near but unknown, no movement occurs. In this case, the benefits of having a moveable decoy are not realized. Also, requiring the hunter to remain stationary near the end of the cord while pulling and releasing the line does not allow the hunter to remain as concealed (as the movement by the hunter to create movement on the decoys is often a problem in and of itself) and/or to move into a favorable or strategic position for observing and aiming at ducks or other animals that may be attracted to the decoys.

Other products exist in the prior art and in the industry for achieving the purpose of simulating animal movement through the use of decoys. For example, some products feature a large motor that pulls and releases a string or other cable attached to decoys. These products are large, bulky, and expensive, which is unfavorable to hunters who already have to keep track of and transport hunting equipment, guns, food, decoys, and even hunting dogs with them when they travel to a hunting destination. Also, these products must often be attached to bulky frames and secured in the ground. They are often loud, generate movement other than at the decoys, and require a larger amount of electrical power to operate.

Other products that exist on the market or that are described in existing prior art have motorized spools for retracting and releasing a line attached to one or more decoys but either require elaborate anchoring apparatuses or expose the spool and/or motorized portions to the elements, which can either cause them to malfunction or can cause debris to get caught in the reel mechanisms.

Thus, the need arises for a small, compact, and portable device that can be used in a decoy apparatus. Specifically, there exists a need for a portable, low-power device that features a weatherproof enclosure to house a motor, a rechargeable power source, and a reel, such that the motor can repeatedly wind and release the reel, causing a cable or other line to retract and release. The line may be attached to an anchor or other solid mount on an opposite end and may have one or more decoys attached thereto, such that the repetitive winding and releasing of the line causes the decoy or decoys to move back and forth.

SUMMARY OF THE INVENTION

The present invention relates to decoys for simulating the movement of animals on land, air, or water. The invention includes a small, enclosed, and portable unit that comprises a motor, a rechargeable power supply, a timing control mechanism, and a spool attached to a line. The line extends from the unit and attaches to one or more animal decoys and, at the end, to an anchoring mechanism (e.g., an anchor placed in the water or a tether attached to a tree or other stationary support). The anchoring mechanism preferably is attached to the line via a bungee cord or other flexible connection that exhibits elasticity.

It is one object of the present invention to provide a system and method for manipulating animal decoys to attract animals' attention.

It is a further object of the present invention to provide a system and method for manipulating animal decoys in a seemingly realistic manner to maintain the attention of target animals.

It is a further object of the present invention to provide a system and method for manipulating animal decoys to divert animals' attention from a human viewer.

It is a further object of the present invention to provide a decoy system that is small, easily moveable, and that can be transported, set up, and operated by a single user.

It is a further object of the present invention to provide a decoy system that can be used with animal decoys in the water, on land, or in the air.

It is a further object of the present invention to provide a decoy system that features a quiet, low-power motor for operating over prolonged periods of time.

It is a further object of the present invention to provide a decoy system that maintains sufficient tension and elasticity in a line and sufficient speed of tugging to enable decoys to create maximum displacement of water when pulled and released.

It is a further object of the present invention to provide a decoy system with an enclosed housing to protect the motor and housing unit from the elements and to prevent debris from being introduced to the spool mechanism.

These objectives are illustrative in nature. Additional advantages and applications for the present invention will be readily apparent to persons skilled in the art upon a review of the invention and the disclosures contained herein.

BRIEF DESCRIPTION OF THE DRAWINGS

The drawings referenced below are included so that the features and advantages of the presently disclosed invention may be better understood. It should be noted, however, that the attached drawings are meant only to be illustrative of particular embodiments of the invention and should not be considered limiting of its scope. The invention itself, as well as a preferred mode of use, further objectives and advantages thereof, will best be understood by reference to the following detailed description of the preferred embodiment when read in conjunction with the attached drawings, which are summarized below.

DETAILED DESCRIPTION OF THE INVENTION

Figure 1:
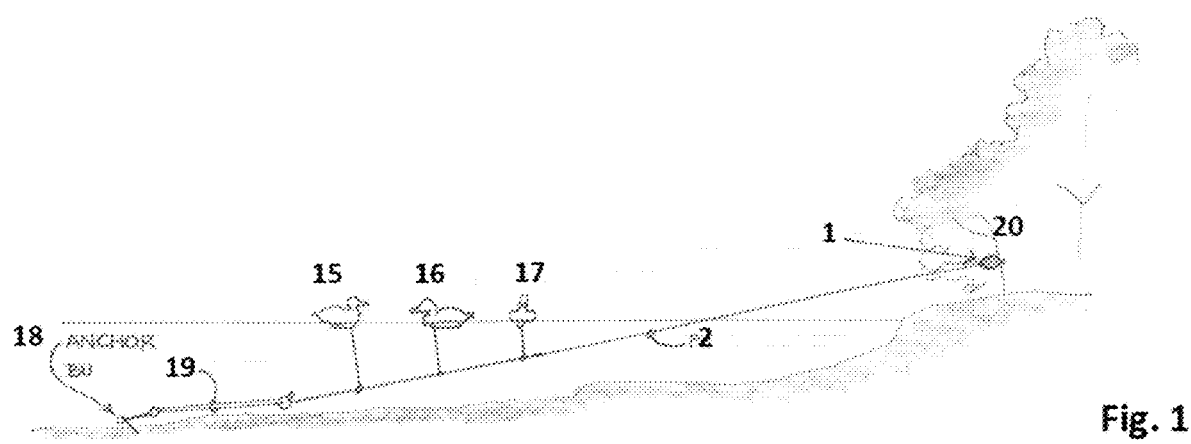
FIG. 1 is an exemplary drawing of one embodiment of the present invention.

Presently preferred embodiments of the invention are shown in the above-identified figures and described in detail below. In describing the preferred embodiments, like or identical reference numerals are used to identify common or similar elements. The figures are not necessarily to scale, and certain features and certain views of the figures may be shown exaggerated in scale or in schematic in the interest of clarity and conciseness.

The present invention relates to decoys for simulating the movement of animals on land, air, or water. The invention includes a small, enclosed, and portable unit that comprises a motor, a rechargeable power supply, a timing control mechanism, and a spool attached to a line. The line extends from the unit and attaches to one or more animal decoys and, at the end, to an anchoring mechanism (e.g., an anchor placed in the water or a tether attached to a tree or other stationary support). The anchoring mechanism preferably is attached to the line via a bungee cord or other flexible connection that exhibits elasticity. The preferred embodiment of the invention comprises four main parts: (1) a string portion, which extends from an anchor system to a mechanical unit; (2) one or more animal decoys attached to the string portion; (3) an anchor assembly attached to one end of the string assembly for creating tension in the string assembly and securing its position; and (4) a mechanical unit containing a low-power, motorized spool assembly, a rechargeable power supply, a spool, and a timing mechanism for repeatedly winding and releasing the string portion.

FIG. 1 is an exemplary drawing of one embodiment of the present invention. As shown in FIG. 1, the preferred embodiment of the present invention includes a string portion 2, one or more animal decoys 15, 16, and 17, attached to the string portion 2, an anchor assembly 18 attached to the string portion 2 by means of an elastic connection 19 (e.g., a bungee cord), and a mechanical unit 1 that may be attached to a stationary device such as a tree 20. Mechanical unit 1 could also be attached to another stationary object such as a stake or other object for securing the unit 1 such that it is immobile. During set up of the apparatus, the string portion 2 is pulled taught so as to create tension in the string portion 2 and the elastic connection 19. A motor inside the mechanical unit 1 winds the string portion 2 around a spool and then releases it. When the string portion is wound around the spool, the elastic connection 19 stretches, creating greater tension. When the string is released, the tension in the elastic connection 19 causes the string to retract, thus unwinding the spool inside the mechanical unit 1. The movement of the string portion 2 back and forth in this manner causes the one or more decoys 15, 16, and 17 to move back and forth, thus causing the appearance that the decoys are swimming back and forth on the surface of the water.

The string portion 2 is preferably made of fishing line but may be any light weight material that is suitable for winding around a spool and that exhibits sufficient tensile strength to maintain tension in a line while attached to the elastic connection 19 and the mechanical unit 1 (e.g., fishing line, nylon string, small-gauge metal cable). The anchor assembly 18 may be anchored to the bottom of a water body or may be tied to or otherwise connected to a tree, stake, or other stationary object (e.g., vehicle). Similarly, the mechanical unit 1 may be attached to a tree, stake, or other stationary object. The mechanical unit 1 should preferably be positioned out of the water to facilitate smooth movement of the string portion 2 and to avoid unnecessary introduction of debris to the apparatus.

Figure 2:
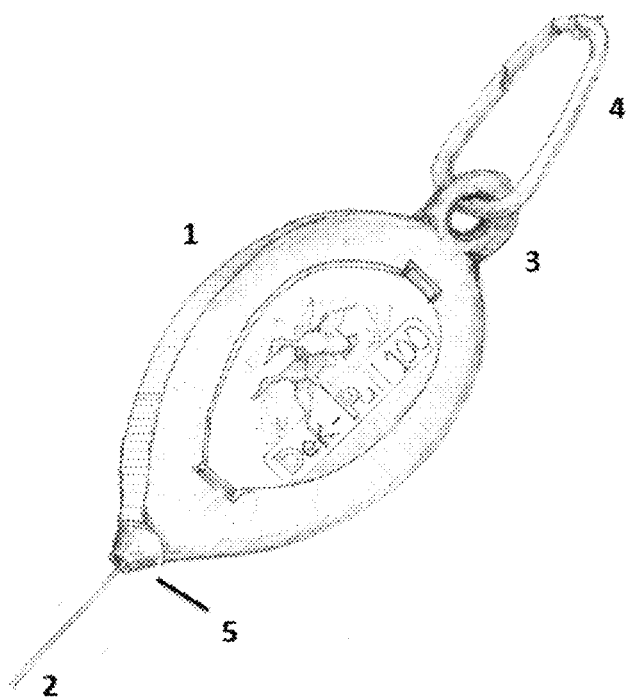
FIG. 2 is an exemplary mechanical housing unit in accordance with one embodiment of the present invention.

FIG. 2 is an exemplary mechanical housing unit in accordance with one embodiment of the present invention. The exterior of the mechanical housing 1 features an aperture 5 through which the string portion 2 is passed. Preferably, the aperture 5 is narrow, e.g., smaller than ⅛ inch in diameter. This serves two purposes. First, by having a narrow aperture 5 (i.e., preferably with an opening 2-5 times the diameter of string portion 2), the string portion 2 will maintain a substantially constant direction when the motorized spool is engaged and released. Second, by having a narrow aperture 5, foreign debris is less likely to enter the mechanical unit 1, thus clogging the gears or otherwise impeding the movement of the spool and string portion. At the opposite end of mechanical unit 1 from the aperture 5 is a connection means 3—ideally an eye hook or other rigid structure through which a clasp or other fastener 4 may be attached. The fastener 4 may then be used to secure the mechanical unit 1 to a stationary object, such as a stake or a tree.

Figure 3:
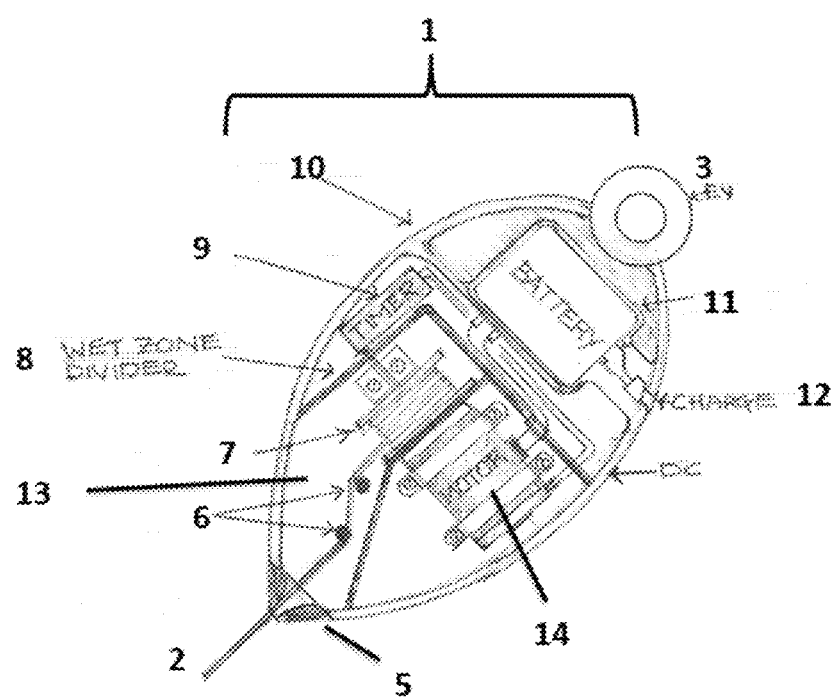
FIG. 3 is an exemplary cross-section of the inside of the mechanical housing unit of FIG. 2.
Figure 4:
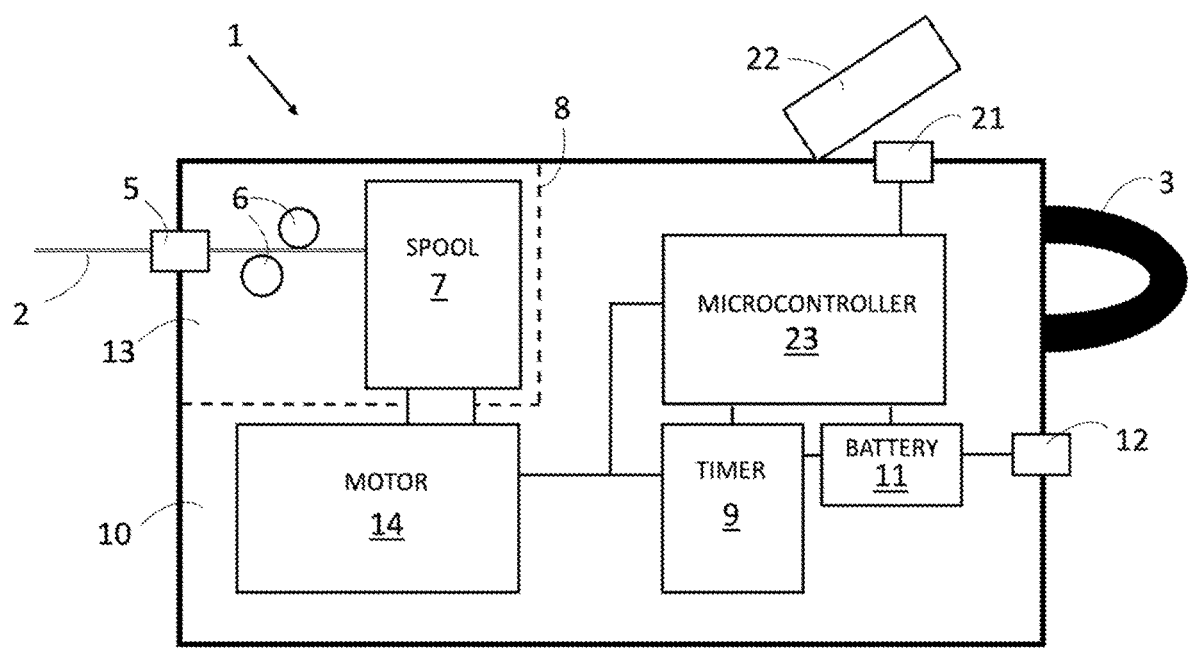
FIG. 4 is an exemplary block diagram of the mechanical housing unit of FIG. 2.

FIG. 3 is an exemplary cross-section of the inside of the mechanical housing unit 1 of FIG. 2. FIG. 4 is an exemplary block diagram of the mechanical housing unit 1 of FIG. 2. At one end of the mechanical housing 1 is an aperture 5 through which string portion 2 passes. Preferably, the interior of mechanical unit 1 is partitioned into a "wet zone" 13 and a "dry zone" 10. Wet zone 13 and dry zone 10 are separated by a wet zone divider 8, which is a water-tight partition through which certain elements may pass but which protects the dry zone 10 from water or other elements. Dry zone 10 houses a rechargeable power system that comprises a battery 11, an input 12 for an external power source for recharging the battery 11, a timer 9, and a motor 14. The motor 14 is preferably a high-torque, low power, one-directional motor. The power system is programmed to engage the motor 14 in a pre-set pattern as set in and controlled by the timer 9, such that the motor 14 turns on and off at selected intervals. The motor 14 is connected to a spool 7, around which the string portion 2 is wound. The operation of the motor 14 at intervals set in the timer 9 causes the spool 7 to spin, thus winding the string portion 2 around the spool and causing it to retract, increasing the tension and causing the decoys 15, 16, and 17 to move. When the motor 14 stops spinning the spool at the end of a given interval, the elastic connection 19 retracts, pulling the string portion 2 back to a resting state and unwinding it from the spool 7. Inside mechanical unit 1, string guides 6 are set to align string portion 2 properly with spool 7 such that the spinning of the spool 7 in response to the operation of motor 14 causes the string portion 2 to wind around spool 7 properly. The device includes an on/off switch 21 (shown in FIG. 4) for activating the internal motor 14. Preferably, the mechanical housing unit 1 also features a safety switch 22 (shown in FIG. 4), which locks the motor of the device in an "off" position to prevent activation of the motor while the mechanical housing unit 1 is being transported, e.g., in a bag or other carrying device. Preferably, the safety switch 22 is a latch or other rigid cover that snaps in place over the activation switch 21 for the device, such that it cannot be accidentally bumped and switched to an "on" position.

In an alternate embodiment of the present invention, the motor 14 is controlled via a microcontroller 23 (shown in FIG. 4) that can be programmed to power the motor 14 at varying time intervals and speeds so as to add variability to the movement of the animal decoys 15, 16, and 17.

In another alternate embodiment, the motor 14 controls the movement of land-based decoys arranged on a track to simulate movement on the ground.

Although the invention has been described with reference to one or more particular embodiments, this description is not meant to be construed in a limiting sense. Various modifications of the disclosed embodiments as well as alternative embodiments of the invention will become apparent to persons skilled in the art upon reference to the description of the invention. It is therefore contemplated that the appended claims will cover any such modifications or embodiments that fall within the scope of the invention.

What is claimed is:

1. A portable mechanical apparatus for simulating movement of animals, comprising:

a mechanical housing unit containing a wet portion and a dry portion, wherein said wet portion and said dry portion are divided by a moisture barrier;

said wet portion further comprising a spool;

said dry portion further comprising a motor, a rechargeable power supply electronically coupled to said motor, and a timer, wherein activation of said motor causes said spool to turn;

a port for connection to an AC power source, wherein said port is electrically coupled to said rechargeable power supply and wherein connection to said AC power source recharges said rechargeable power supply;

said mechanical housing unit further comprising an aperture and a connection means for securing said mechanical housing unit to a stationary object;

said mechanical housing unit further comprising an external switch for turning on power to said mechanical apparatus;

a string with a proximal end and a distal end, said proximal end wound around said spool and said distal end extending through said aperture out of said mechanical housing unit and connected to an elastic cord;

one or more string guides coupled to said mechanical housing unit for directing said string through said aperture; and one or more animal decoys attached to said string.

* * * * *